UNITED STATES PATENT OFFICE.

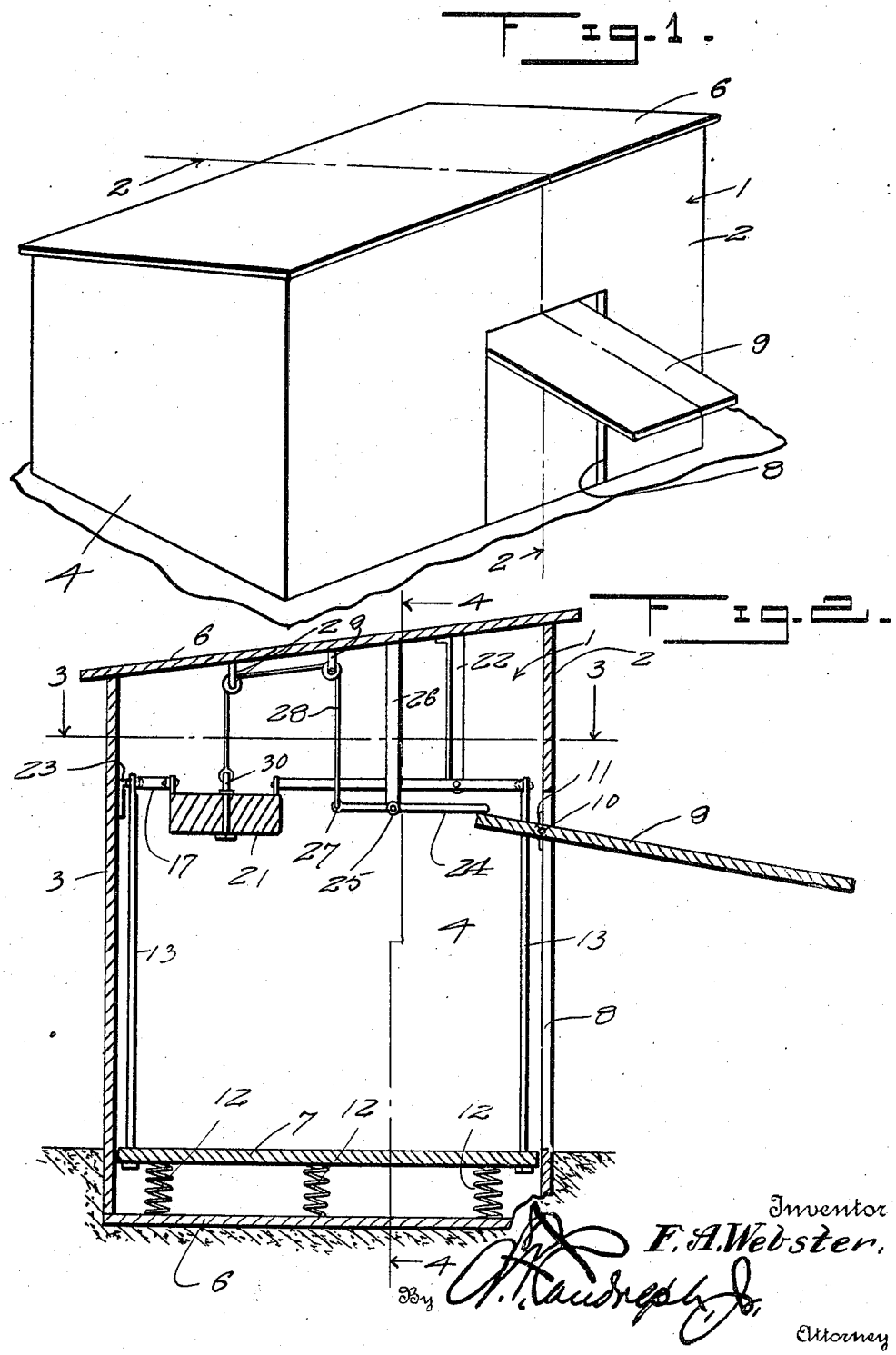

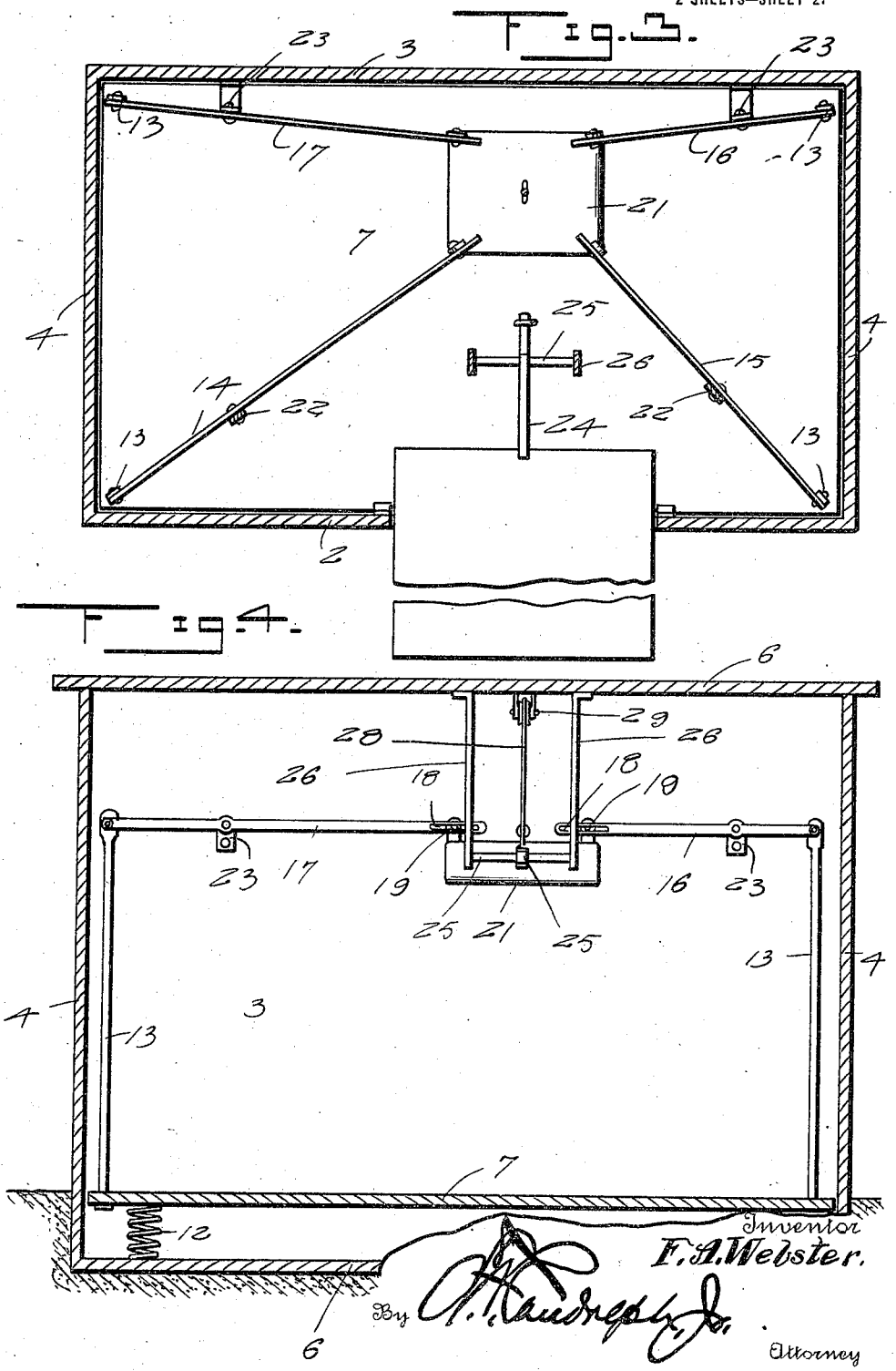

FRANK A. WEBSTER, OF LILBOURN, MISSOURI.

DEVICE FOR HOUSING HOGS.

1,306,365.  Specification of Letters Patent.  Patented June 10, 1919.

Application filed May 15, 1918. Serial No. 234,613.

*To all whom it may concern:*

Be it known that I, FRANK ANDERSON WEBSTER, a citizen of the United States, residing at Lilbourn, in the county of New Madrid and State of Missouri, have invented certain new and useful Improvements in Devices for Housing Hogs; and I do hereby declare the following to be a full, clear, and exact description of the invention, such as will enable others skilled in the art to which it appertains to make and use the same.

This invention relates to hog housing devices and the primary object of the invention is to provide an improved hog housing device in which only a certain number of hogs can enter therein, and thereby eliminating the crowding of the housing device and the possibility of the hogs being crushed.

Another object of the invention is to provide an improved hog housing device, having a pivoted entrance door, which is adapted to be closed after a predetermined number of hogs have entered the housing device, and thereby preventing the entrance of other hogs and the crowding of the housing device.

A further object of the invention is the provision of a hog housing device having a movable platform therein, which is operatively connected with a pivoted door, so that upon the entrance of a predetermined number of hogs into the house, the platform will be operated, so as to close the door.

A still further object of the invention is to provide an improved hog housing device, of the above character which is durable and efficient in use, one that is simple and easy to manufacture and one that can be placed upon the market at a reasonable cost.

With these and other objects in view the invention consists in the novel construction, arrangement and formation of parts, as will be hereinafter more specifically described, claimed and illustrated in the accompanying drawing, forming a part thereof in which:

Figure 1 is a perspective view of the improved hog housing device,

Fig. 2 is a transverse cross section taken on the line 2—2 of Fig. 1,

Fig. 3 is a horizontal section taken on the line 3—3 of Fig. 2,

Fig. 4 is a vertical longitudinal cross section taken on the line 4—4 of Fig. 2.

Referring to the drawings in detail, wherein similar reference characters designate corresponding parts throughout the several views, the numeral 1 generally indicates the improved hog housing device, which includes the front and rear walls 2 and 3; the end walls 4, bottom and top walls 5 and 6.

The bottom wall 6 is adapted to be placed below the level of the ground and a platform 7 is arranged in the housing in alinement with the level of the ground. The front wall 2 is provided with a central opening 8, by means of which the hogs are allowed to enter the casing 1 and a door 9 is arranged to close the opening and is provided with outstanding trunnions 10 at its side edges adjacent to the upper edge thereof which are received in suitable bearings 11 carried by the inner surface of the front wall 2 on each side of the opening 8.

Suitable coil springs 12 of the expansion type are positioned intermediate the platform 7 and the flooring 5 and support the platform in the desired position and these coil springs can be of any desired tension, for a purpose which will hereinafter more fully appear.

The platform 7 has secured thereto at each corner thereof upstanding rods 13, the upper ends of which pivotally receive the outer ends of levers 14, 15, 16 and 17. The levers 14, 15, 16 and 17 have the inner ends thereof provided with slots 18 which slidably and pivotally receive pins 19 carried by upstanding ears 20 formed on each corner of the weight 21, which is arranged to coöperate with the springs 12 in holding the platform 7 in its raised position.

The levers 14 and 15 are pivoted intermediate their ends to depending rods 22, which are secured to the upper wall 6 of the housing. The levers 16 and 17 are pivotally secured intermediate their ends to angle brackets 23, which are secured to the rear wall 3.

A trigger 24 is mounted intermediate its ends on a shaft 25 which has its terminals secured to a pair of spaced depending arms 26, which are carried by the top wall 6. The inner end of the lever is provided with an eye 27, in which is secured one end of the flexible cable 28 which extends over a pair of spaced pulleys 29 carried by the upper wall 6 and has the opposite end thereof secured to a bolt 30 carried by the weight 21. The bolt 30 extends entirely through the weight 21 at the central portion thereof and the upper end of the bolt is provided with a hooked end to which the cable is secured. The free end of the trigger 24 is adapted to be positioned over the free upper end of the door 9 when the same is in its opened position, and the trigger prevents, through the medium of the weight 21, the downward movement of the door. When a number of hogs enter the housing 1 sufficient to overcome the tension of the springs 12 and weight 21, the platform 7 will lower and thus raise the free outer end of the trigger 24, and allow the door to gravitate to a closed position, which will effectively prevent the entrance of other hogs into the housing. The size of the weight 21 can be varied, and springs of different tension, can be provided so that the door 9 will be operated when the desired number of hogs enter the housing.

In practice, I have found that the form of my invention, illustrated in the accompanying drawings and referred to in the above description, as the preferred embodiments, is the most efficient and practical; yet realizing the conditions concurrent with the adoption of my device will necessarily vary, I desire to emphasize the fact that various minor changes in details of construction, proportion and arrangement of parts may be resorted to, when required, without sacrificing any of the advantages of my invention as set forth.

What is claimed is:

A device of the class described, a housing having an opening therein, a door pivotally secured adjacent its upper end to the housing and arranged to close the opening, a platform slidably mounted in the housing, a spring means normally holding the platform in a raised position, a plurality of upstanding rods carried by the platform, a weight, levers pivotally connecting the upper ends of the rods with the weight, means pivotally securing the levers intermediate their ends, a trigger pivoted intermediate its ends to the housing and having the outer end thereof arranged to engage the upper end of the door to normally hold the same in a raised position, and a flexible means for connecting the inner end of the trigger with the weight, as and for the purpose specified.

In testimony whereof I affix my signature in presence of two witnesses.

FRANK A. WEBSTER.

Witnesses:
O. B. COATS,
R. A. McCORD.

Copies of this patent may be obtained for five cents each, by addressing the "Commissioner of Patents, Washington, D. C."